May 4, 1926.

W. BLENKO 1,583,441

ART GLASS AND METHOD OF MAKING THE SAME

Filed Feb. 26, 1924

William Blenko
INVENTOR

Patented May 4, 1926.

1,583,441

UNITED STATES PATENT OFFICE.

WILLIAM BLENKO, OF MILTON, WEST VIRGINIA.

ART GLASS AND METHOD OF MAKING THE SAME.

Application filed February 26, 1924. Serial No. 695,201.

*To all whom it may concern:*

Be it known that I, WILLIAM BLENKO, a citizen of the United States, residing at Milton, in the county of Cabell and State of West Virginia, have invented certain new and useful Improvements in Art Glass and Methods of Making the Same, of which the following is a full, clear, and exact description.

This invention relates to art glass and a method of making the same, and is particularly useful in the manufacture of a glass which replaces the glass made abroad for centuries and known to the trade as "antique."

Antique glass is that generally found in the finer leaded glass windows, and is made in a wide range of colors. The glass is generally made full of "seeds" or fine bubbles, and a certain variation in thickness and non-uniformity of surface is desirable since it enhances the quality of the glass by adding life and sparkle.

Heretofore, antique glass has been blown in the same manner as ordinary window glass, although generally in much smaller sizes because of the different character of the molten glass and the corresponding difficulty of working it. Glass made in this manner, while satisfactory as a product, is expensive and calls for the utmost skill in blowing. In fact, all antique glass so manufactured is now made abroad, largely because of the scarcity of competent blowers.

I provide for blowing glass in a mold to form a glass vessel, and flattening a portion of the vessel into a sheet. By this process, a glass worker of only ordinary skill may blow a large number of such vessels, preferably of cylindrical form, in a day at very low cost, which cylinders, when flattened, will give an antique glass of unusually fine quality.

In the accompanying drawings, illustrating the present preferred manner of carrying out my invention, Fig. 1 is a vertical section through a mold used in carrying out my improved process.

In the illustrated embodiment of the invention, there is shown a mold 2 of circular cross-section, and preferably tapering slightly toward the bottom. This mold is made of cast iron or other suitable material and should be reasonably smooth, although, for reasons hereinafter set forth, a high polish is not desired.

Figure 1:
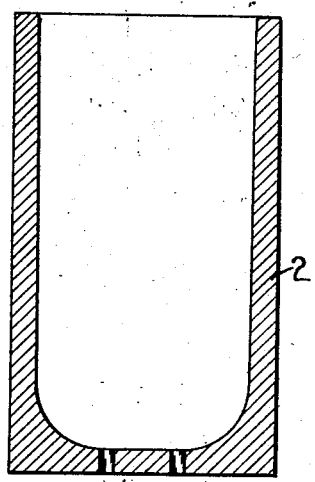
Figure 2:
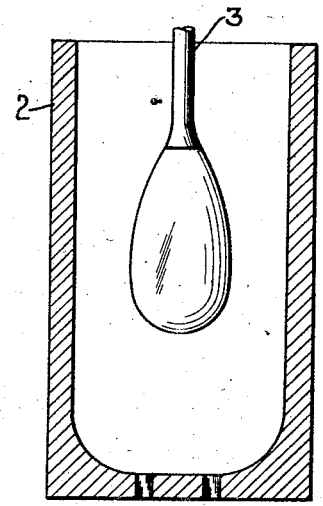
Fig. 2 is a similar view showing a ball of glass inserted and ready to blow.
Figure 3:
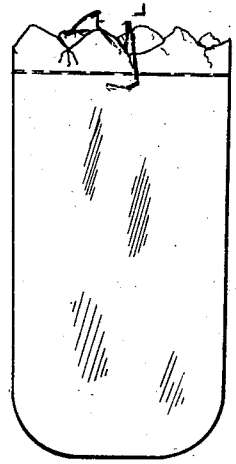
Fig. 3 is a side elevation of a glass vessel blown in the mold of Fig. 1.

In making a sheet of art glass by my process, the operator gathers a suitable quantity of glass on a blowpipe 3 and marvers it in an ordinary shaping block until it takes the general shape shown in Fig. 2. The blowpipe and appended ball of hot glass are then lowered into the mold 2 and the blower applies lung pressure to the upper end of the blowpipe in order to blow the glass out against the walls of the mold.

After the glass vessel has been blown, it is removed from the mold, this being facilitated by the taper form thereof, and then cracked off from the blowpipe. The product is a glass vessel of substantially cylindrical form, with a closed bottom, the shape of the top depending on whether an open or closed top mold has been used. If a closed top, the vessel resembles a large bottle and must be capped at both ends, but if an open top mold of the style shown in the drawings has been employed, the upper cap may be eliminated by pulling the blowpipe upwardly before the glass is set, thus drawing the wall thin above the mold, which thin portion is readily cracked through.

Figure 4:
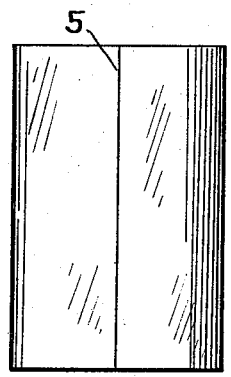
Fig. 4 is a side elevation showing the vessel after the ends have been capped off to form a cylinder for flattening.
Figure 5:
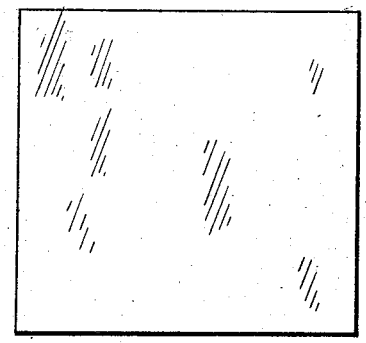
Fig. 5 is a view showing the finished sheet of antique glass.

On account of the general characteristics of antique glass, the cylinders are preferably annealed prior to any further operations. After annealing they are capped off in any desired manner, as by a hot wire, resulting in a cylinder of glass as shown in Fig. 4. This cylinder is split longitudinally, as indicated at 5, and then flattened and annealed, resulting in a sheet of glass as shown in Fig. 5.

On examination of a sheet of art glass made by my process it will be found that it possesses life and sparkle to a marked degree, and these can be enhanced if desired by providing a suitable mold surface. It should be distinctly understood that the mold should not be figured, but that rough turning, or chatter marks produced by using a light turning tool, will enhance the quality of the glass by leaving very fine surface marks, visible only to a person highly skilled in this art, but nevertheless effective for the purpose described.

The advantages of my invention arise from the provision of a method whereby a glass vessel is blown in a mold, a portion of the vessel being flattened into a glass sheet. A vessel of generally cylindrical form is preferred as it will be found convenient to handle and economical to make. The product is superior to antique glass made by the window glass method, and can be produced at a fraction of the cost. Moreover, the sheets are all of uniform size, and are delivered from the flattening oven ready to pack for shipment to the window maker. It will be understood that while it is desired to produce circular cylinders, the word "cylinder" is used in its broadest sense. It will be further understood that while I have shown one manner of carrying out my invention, it is not limited to such embodiment, but may be otherwise carried out within the scope of the following claims.

I claim:

1. The method of making art glass, which includes blowing in a mold a glass vessel of slightly tapered form, removing the vessel from the mold, capping the vessel and flattening the body portion thereof into a sheet.

2. The method of making art glass which includes blowing glass in a mold to form a glass vessel, withdrawing the vessel from the mold, and, without further blowing of the vessel, flattening a portion thereof into a generally plane sheet.

3. The method of making art glass which includes blowing glass in a mold to form a glass vessel, withdrawing the vessel from the mold, and, without further blowing of the vessel, flattening the body portion thereof into a generally plane sheet.

4. The method of making art glass which includes blowing glass in a substantially cylindrical mold to form a vessel of corresponding shape, withdrawing the vessel and capping the same without further blowing, and flattening the capped cylinder into a generally plane sheet.

5. The method of making art glass which includes blowing glass in a mold to form a glass vessel, annealing the vessel without further blowing, flattening a portion of the vessel into a generally plane sheet, and annealing the sheet.

6. The method of making art glass which includes blowing glass in a mold to form a glass vessel, the walls of the mold being unpolished, withdrawing the vessel from the mold, and, without further blowing of the vessel, flattening a portion thereof into a generally plane sheet.

7. The method of making art glass which includes blowing glass in a mold to form a glass vessel, the walls of the mold having chatter marks thereon, withdrawing the vessel from the mold, and, without further blowing of the vessel, flattening a portion thereof into a sheet.

8. As a new article of manufacture, a sheet of art glass blown in a mold and flattened into a generally plane sheet without being blown after its removal from the mold.

9. As a new article of manufacture, a sheet of art glass blown in a mold and flattened into a generally plane sheet, the sheet having mold marks thereon undistorted by blowing after removal from the mold.

10. As a new article of manufacture, a sheet of art glass comprising a flattened and generally plane portion of a glass article, blown to substantially its final thickness within the confines of a mold.

In witness whereof I have hereunto set my hand.

WILLIAM BLENKO.